United States Patent

Ariga

[11] Patent Number: 5,743,171
[45] Date of Patent: Apr. 28, 1998

[54] OIL CONTROL RING AND GROOVE ARRANGEMENT FOR IMPROVED BLOWBY CONTROL

[75] Inventor: Susumu Ariga, San Antonio, Tex.

[73] Assignee: Southwest Research Institute, San Antonio, Tex.

[21] Appl. No.: 818,539

[22] Filed: Mar. 14, 1997

[51] Int. Cl.$^6$ ........................................................ F16J 1/04
[52] U.S. Cl. ............................ 92/208; 277/53; 277/170; 277/172
[58] Field of Search ...................... 92/193, 208; 277/53, 277/170, 172; 123/193.6

[56] References Cited

U.S. PATENT DOCUMENTS

| | | | |
|---|---|---|---|
| 1,584,470 | 5/1926 | Quintenz | 277/172 |
| 1,737,658 | 12/1929 | Howe. | |
| 2,599,851 | 6/1952 | Marchal et al. . | |
| 2,834,643 | 5/1958 | Hutto | 277/53 |
| 3,237,953 | 3/1966 | Lucas | 277/172 |
| 4,649,806 | 3/1987 | Hartsock . | |
| 4,899,702 | 2/1990 | Sasaki et al. . | |
| 5,071,142 | 12/1991 | Rehfeld | 277/142 |
| 5,305,683 | 4/1994 | Wittwer et al. . | |

FOREIGN PATENT DOCUMENTS 3511836  10/1986  Germany .

*Primary Examiner*—Thomas E. Denion
*Attorney, Agent, or Firm*—Jenkens & Gilchrist

[57] ABSTRACT

Noncontacting surface areas are provided between the top wall of an oil control ring and the top surface of its groove to avoid entrapment of oil between adjacent surfaces of the two members during downward motion of a piston in a reciprocating, internal combustion engine. The noncontacting surface areas may be provided by circular grooves formed in the top surface of the groove or the ring. Alternatively, either the top surface of the groove or the top wall of the oil control ring may be formed so that it slopes away from the surface of its mating member and forms a tapered annular cavity that diverges away from the outer cylindrical surface of the piston. All of the described arrangements reduce the contact area between the top of the ring and the top of the groove during downward movement of the piston, thereby permitting the oil control ring to seal against the upper surface of its groove. The present invention effectively controls the flow of oil toward the compression ring during intake and expansion strokes of the engine.

3 Claims, 3 Drawing Sheets

5,743,171

1

OIL CONTROL RING AND GROOVE ARRANGEMENT FOR IMPROVED BLOWBY CONTROL

BACKGROUND OF THE INVENTION

1. Technical Field

This invention relates generally to piston and oil control ring constructions for use in reciprocating engines, and more particularly to such a construction that includes features for reducing oil flow and blowby past the compression ring of a piston.

2. Background Art

It is becoming increasingly difficult to meet the emissions standards for nitrogen oxides ($No_x$) and particulate emissions (primarily unburned oil) as emission standards become more stringent, in particular for diesel engines. Generally, it is fairly easy to optimize one or the other, but difficult to control both $No_x$ and particulate emissions simultaneously due to the tradeoffs that must be made in engine operating conditions and controls. Reduced emissions must be maintained within a small deviation over a fairly long period of time or number of miles that the engine is operated. However, the level of oil consumption as a source of oil-derived particulates varies depending on engine operating condition, engine design, and type of engine. This problem exists in both diesel and spark-ignition engines.

Also, additives commonly incorporated in lubricating oil, such as zinc- and phosphate-containing products, if emitted in sufficient quantities into the exhaust system as a result of oil consumption, are harmful to catalysts and other aftertreatment devices located in the exhaust system. Because the oil consumption mechanism of a particular engine is difficult to predict, numerous engine experiments and tests are often necessary for a particular engine design until the optimum component design and acceptable range of clearance tolerances are found for achieving a target oil consumption level. However, even with an engine optimally designed to achieve low initial oil consumption, that consumption level will increase as the engine wears.

Actual measurements made of such in-cylinder variables as ring motion, piston motion, inter-ring gas pressure and temperature, were simultaneously measured with real-time oil consumption in a modern diesel engine under step-transient operation, indicate that the amount of oil flow toward the compression ring, or rings, is significantly high in both intake and expansion strokes, especially under light load. Thus, the piston ring path appears to be lubricated with more oil than necessary. The excess amount of oil is believed to be one of the sources of in-cylinder oil consumption. The other source of in-cylinder oil consumption is attributable to distortion of the cylinder bore.

In a series of tests, conducted by the inventor of the present invention, piston ring motion measurements were made on a commercially produced heavy-duty diesel engine under no load steady state, full load steady state, and step transient operation, all at 800 RPM. The results of those measurements are shown in graph form in the lower portion of FIG. 1. The ideal motion of the oil control ring is represented by a solid line 10 wherein the top of the oil control ring is in desirable physical contact with the upper surface of its groove during the intake stroke (from −360° to −180° crank angle), and the expansion stroke (from 0° to 180°). In both instances the piston is moving downwardly. During the intervening compression and exhaust strokes, from −180° to 0° and from 180° to 360° respectively, the piston is moving upwardly and desirably the oil control ring

2 is seated at the bottom of its groove. The motion of the oil control ring under no load conditions is represented by a dashed line 12, under full load conditions by an alternating dash and dot line 14, and under step transient conditions by a dotted line 16. In the upper portion of the graph shown in FIG. 1, the corresponding pressure above the oil control ring, representing blowby pressure in the inter-ring cavity, is likewise shown. The inter-ring pressure under no load at 800 RPM is represented by a dashed line 18, under full load conditions at 800 RPM by an alternating dot and dash line 20, and under step transient operation at 800 RPM from no load to full load by a dotted line 22.

The measurements indicate that there is considerable clearance between the top of the oil control ring and the upper surface of its groove when the piston is moving downwardly during the intake and expansion strokes (crank angle from −360° to −180° and 0° to 180°, respectively). Furthermore, it should be noted that during the expansion stroke (crank angle 0° to 180°) the clearance between the top of the oil control ring and the upper surface of its groove is greatest. It is also noted that the blowby pressure also peaks during this portion of the cycle and reaches its maximum value early in the expansion stroke when the oil control ring-groove surface clearance is greatest, particularly under no load and step transient operation.

Thus, the above measurements indicate that even though the piston is moving downwardly, the oil control ring does not contact the top of its groove. Through this groove, a substantial amount of oil flows toward the compression ring during downward movement of the piston. Ideally, the oil control ring restricts oil flow when the piston is moving downward in order to reduce oil consumption due to oil flow through the ring path. However, as the measured data demonstrates, it is found that the oil control ring takes a relatively long time in each cycle to move from the bottom to the top of its groove, especially under light load and transient operation.

In another series of tests on the same engine, it was found that piston temperature takes a considerable amount of time, on the order of about 800 seconds, to stabilize from no load to full load operation at 800 RPM, even though torque output reached its near full load value in about 45 seconds. Accordingly, oil viscosity changed from high to low during the step transient cycle operation as the component temperatures increased and finally stabilized. Before oil temperature stabilized at the higher temperature, oil between the oil control ring and its groove was likely to produce a high damping force (squeeze film effect) and prevent the oil control ring from contacting the upper surface of its groove during the intake and expansion strokes. It is strongly believed that this explains why the oil control ring does not completely seat against the upper groove surface during downward motion of the piston. Thus, oil between the piston skirt and the cylinder wall is forced by the piston, moving downwardly, to flow through the clearance between the upper surface of the oil control ring and the upper surface of the groove toward the compression ring.

FIGS. 2 and 3 show the calculated oil flow through the clearance between the oil control ring and the upper surface of the groove during downward motion of the piston, based on the measured data illustrated in FIG. 1. The calculated oil flow through the oil control ring under no load conditions is shown in the lower portion of FIG. 2. The measured position of the oil control ring with respect to the top of its groove, under no load operation as shown in FIG. 1, is replicated in the top portion of FIG. 2 for reference purposes. FIG. 3 shows the calculated oil flow through the oil ring for approximately 42 seconds during the step transient at 800 RPM from no load to full load. The lower dotted line represents the oil flow during the intake stroke and the upper solid lines represents the oil flow during the expansion stroke. Thus, the above measurements and calculated values demonstrate that varying amounts of oil are pumped into the inter-ring pack area, depending on engine load and oil temperature. Therefore, an effective method to control oil flow is necessary to achieve a low oil consumption level in a new engine, and maintain low oil consumption during the life of the engine, under all operating conditions.

In a copending application, assigned Ser. No. 08/818,540 filed Mar. 14, 1997 by the inventor of the present invention and titled *BLOWBY PRESSURE CONTROL ABOVE AN OIL-CONTROL RING IN A RECIPROCATING INTERNAL COMBUSTION ENGINE*, discloses a piston construction for improving the ability an oil control ring to quickly seat against the top of its groove when the piston changes direction for an upward movement during compression and exhaust to a downward movement during intake and expansion. In the copending application, a passageway is provided in the outer cylindrical of the piston, at a position between the compression and oil control rings, that communicates with a cavity in the oil control groove located behind the oil control ring.

The present invention is also directed to overcoming the problems set forth above. It is desirable to have a piston and ring assembly wherein the top of the oil ring control ring is able to provide a seal against the top of its groove during downward movement of the piston. It is also desirable to have such an arrangement in which the oil film typically captured between the top surfaces of the ring and groove is dramatically reduced, permitting rapid closure and sealing between the mating surfaces and the reduction of blowby pressure to the inter-ring cavity. It is also desirable to have such a piston and ring arrangement that provides reduced surface contact area between the top of the oil control ring and the upper groove surface.

BRIEF SUMMARY OF THE INVENTION

In accordance with one aspect of the present invention, a piston and ring assembly for internal combustion engines has an annular groove formed in the outer cylindrical surface of the piston. The annular groove is defined by a cylindrical wall that is spaced inwardly from the cylindrical surface of the piston and upper and lower radial walls that are spaced apart at a predefined distance and extend between the cylindrical surface of the piston and the cylindrical wall of the groove. An oil control ring is disposed in the annular groove and has a thickness, as measured between a top and a bottom radial surface of the ring, that is less than the predefined distance between top and bottom radial walls of the groove. A plurality of radially-spaced cylindrical grooves are formed in the surface of at least one of the top radial wall of the groove or the top radial wall of the ring. The cylindrical grooves extend inwardly from the respective radial wall surface by a distance that is a least 50 percent of the difference between the predefined distance between the upper and lower radial walls of the groove and the thickness of the oil control ring.

Other features of the piston and ring assembly for an internal combustion engine, embodying the present invention, include the cylindrical grooves formed in the surface of the respective radial wall extending inwardly by a distance that is from about 50 percent to about 200 percent of the difference between the predefined distance between the upper and lower radial walls of the groove and the thickness of the oil control ring. Other features include the cylindrical grooves being closely radially spaced apart, with respect to each other, by a distance sufficient to collectively provide a noncontacting area between mutually opposed wall of the respective annular grooves that extends over at least 90 percent of the mutually opposed wall areas of the ring and groove when the piston is moving in a downward direction. Still other features of the piston and ring assembly embodying the present invention include the cylindrical grooves are formed by a continuous spirally-shaped groove in which successive radially outwardly spaced winds of the spiral constructively define the cylindrical grooves.

In accordance with another aspect of the present invention, a piston and ring assembly for internal combustion engines has an annular groove formed in the outer cylindrical surface of the piston. The annular groove is defined by a cylindrical wall spaced radially inwardly from the cylindrical surface of the piston, and by upper and lower walls that respectively extend inwardly from the cylindrical surface of the piston to the cylindrical wall of the groove. The upper and lower walls of the groove are spaced apart, at the cylindrical surface of the piston, by a predefined distance. An oil control ring is disposed in the annular groove and has a thickness less than the predefined spaced apart distance of the upper and lower walls of the groove. At least one of the upper wall of the groove or the upper wall of the oil control ring are disposed at an angle away from a plane normal to a central axis of the piston so that a tapered, inwardly-diverging, annular cavity is formed between the upper wall of the groove and the upper wall of the ring when respective portions of the top surface of the ring and the top surface of the groove, adjacent the cylindrical surface of the piston, are in mutual contact.

Other features of the present invention include at least one of the upper wall of the groove and the upper wall of the ring diverging away from the plane normal to the central axis of the piston at an angle of from about 4° to about 8°.

BRIEF DESCRIPTION OF THE DRAWINGS

A more complete understanding of the structure and operation of the present invention may be had by reference to the above-described discussion and the following detailed description when taken in conjunction with the accompanying drawings, wherein.

DETAILED DESCRIPTION OF PRESENTLY PREFERRED EXEMPLARY EMBODIMENTS

As described above, if oil flows through the oil control ring during the intake or expansion stroke and is transported above the top, or compression ring, it is not likely to burn completely and tends to become a source of particulate emissions. Thus, it is extremely important to seal oil at the oil control ring in order to reduce the amount of oil available for flow through the top ring.

A portion of a piston 50, embodying the present invention, is shown in section in FIGS. 4-9. The piston 50 is of the type used in reciprocating internal combustion engines in which the piston 50 is disposed in the bore of a cylinder, not shown. The piston 50 includes at least two annular grooves formed in an outer cylindrical surface 52 of the piston. In the illustrated embodiments, only one of the annular grooves, an oil control ring groove 54, is shown.

Figure 1:
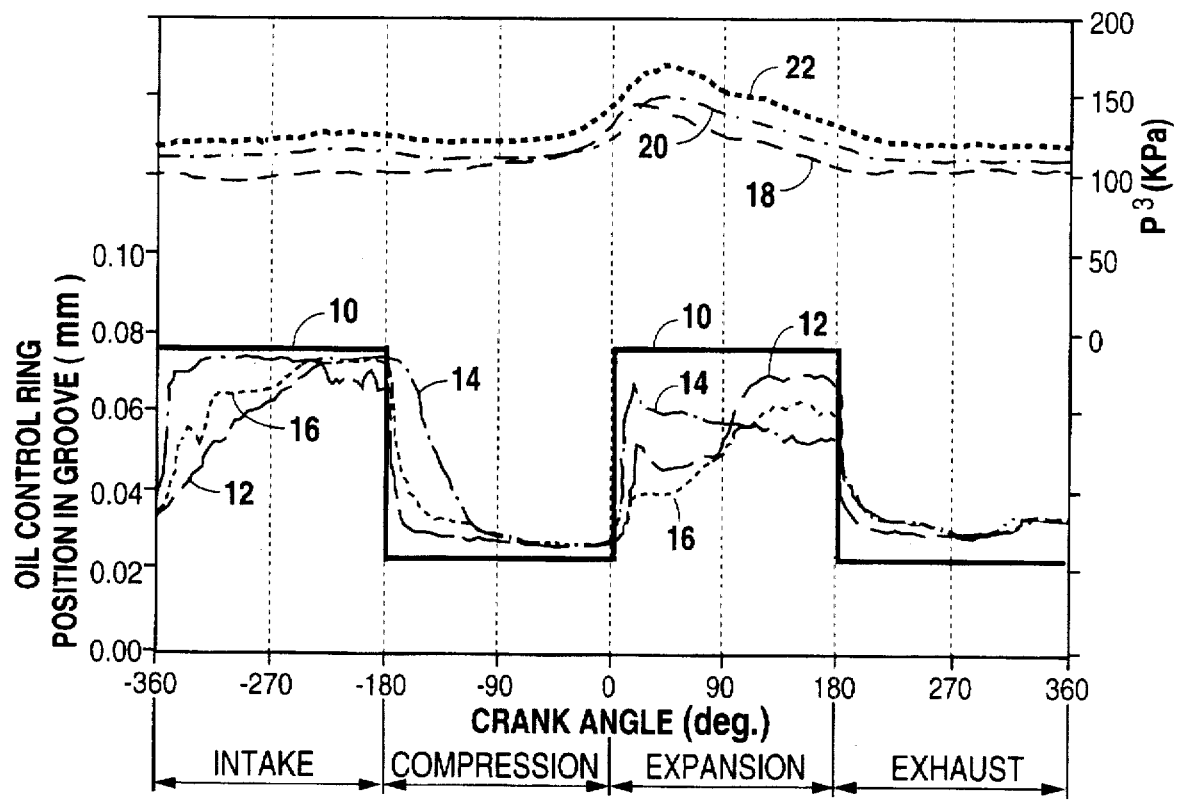
FIG. 1 is a graphical representation of the oil control ring motions and inter-ring pressures of a conventional diesel engine operating at 800 RPM under no load, full load, and step transient operating conditions.
Figure 2:
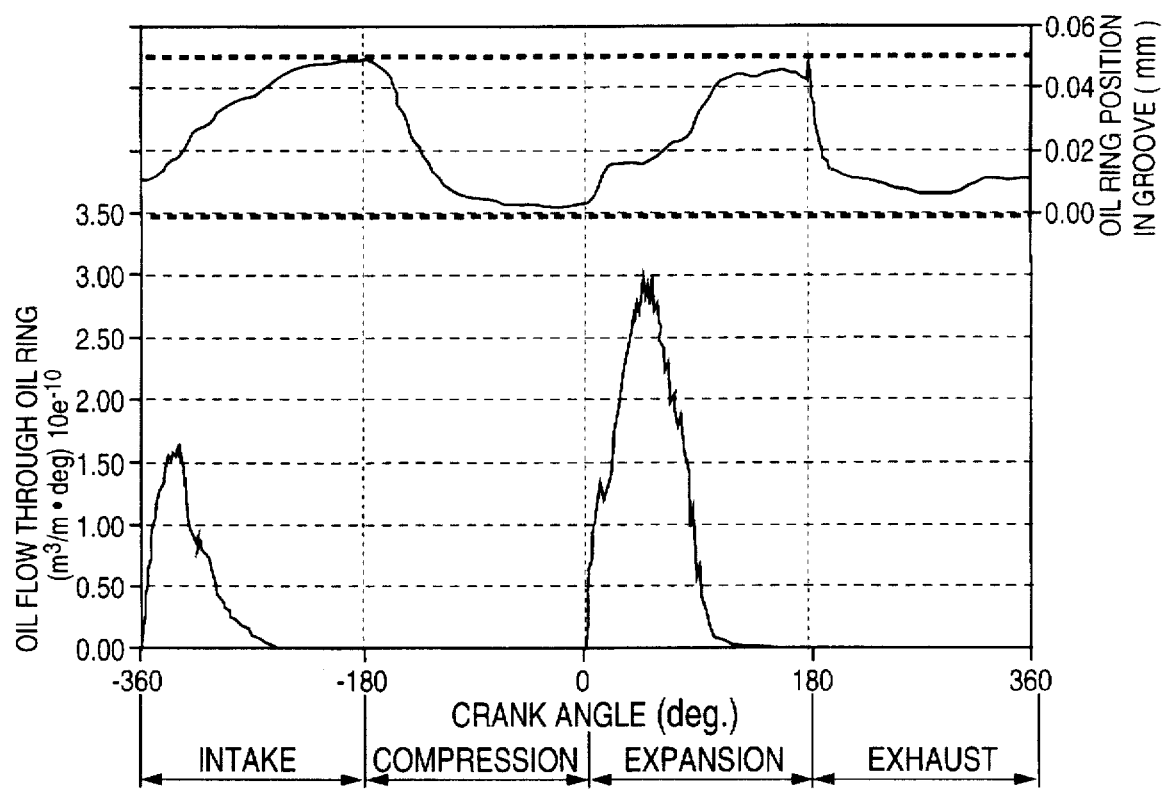
FIG. 2 is a graphical representation of the calculated oil flow through the oil control ring of the same engine tested in FIG. 1, with the corresponding inter-ring pressure when the engine was operating at 800 RPM under no load.
Figure 3:
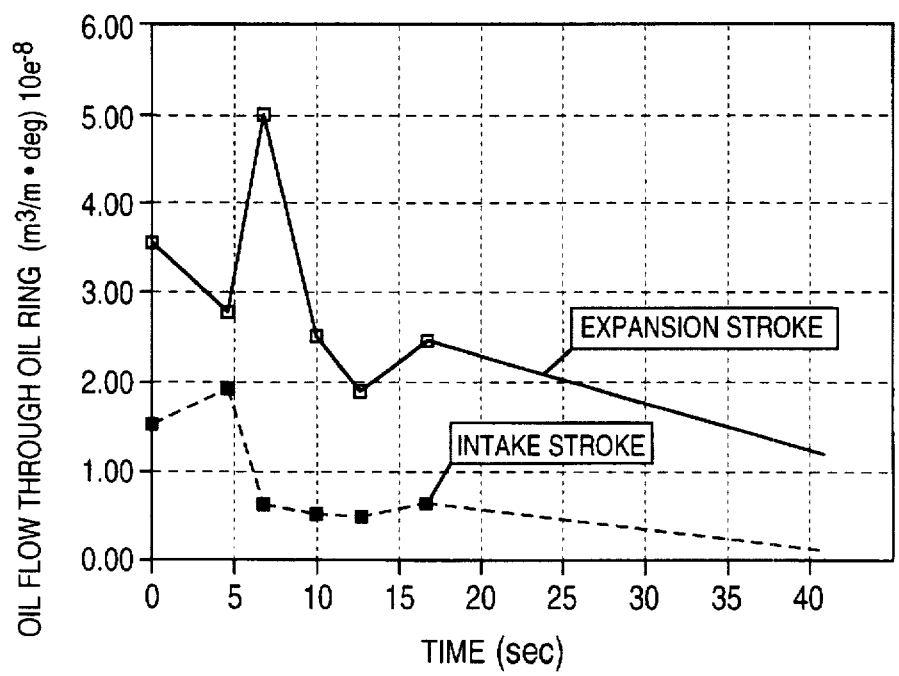
FIG. 3 is a calculation of the volume of oil flow through the oil control ring, based on the measurements shown in FIG. 1, when the engine is operating under step-transient conditions at 800 RPM from no load to 100% load.
Figure 4:
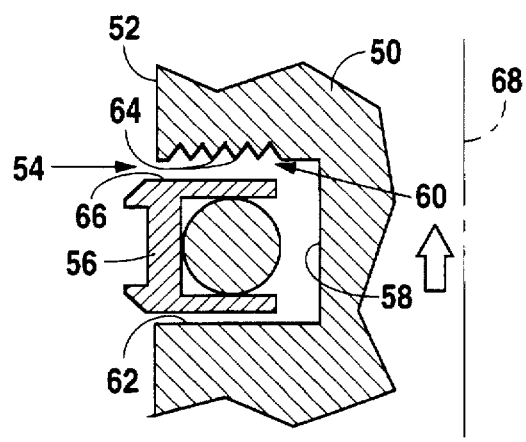
FIG. 4 is a cross-sectional view of a portion of a piston and ring assembly representing one embodiment of the present invention, showing the position of the oil control ring when the piston is moving in an upward direction.
Figure 5:
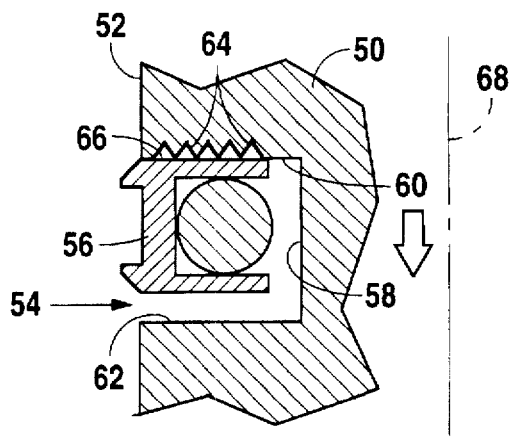
FIG. 5 is a cross-sectional view of a portion of the piston and ring assembly representing the embodiment of the present invention illustrated in FIG. 4, showing the position of the oil control ring when the piston is moving in a downward direction.

In a first embodiment, illustrated in FIGS. 4 and 5, the annular oil control ring groove is designated by the reference number 54. In a second embodiment, illustrated in FIGS. 6 and 7, the annular groove is designated by the reference number 54'. In third and forth embodiments, shown in FIGS. 8 and 9, the annular groove has a conventional construction and is identified by the reference number 54". Each of the embodiments will be described in detail in the following description.

An oil control ring is operatively disposed in each of the oil control ring grooves. In a first arrangement of the oil control ring, shown in FIGS. 4-7, the oil control ring has a conventional construction and is designated by the reference number 56. In an alternate embodiment, shown in FIG. 8, the oil control ring is identified by the reference number 56', and in another alternate embodiment, shown in FIG. 9, by the reference number 56".

In the first embodiment of the piston and ring assembly embodying the present invention, shown in FIGS. 4 and 5, the oil control ring groove 54 is defined by a cylindrical wall 58 that is spaced inwardly from the cylindrical surface 52 of the piston and forms the base of the groove 54. An upper radial wall 60 and a lower radial wall 62 of the groove 54 respectively extend inwardly from the cylindrical surface 52 to the base 58. The upper and lower radial walls 60,62 are spaced apart at a predefined distance that is greater than the thickness of the oil control ring 56 that is mounted for limited vertical movement within the groove 54.

The upper radial wall 60 of the groove 54 has a plurality of circularly disposed grooves 64 defined in the surface of the upper wall 60. The purpose of the circularly disposed grooves 64 is to provide firm sealing of oil by the oil control ring 56 when the piston 50 is moving downwardly, for example during the intake and expansion and exhaust strokes as indicated by the directional arrow in FIG. 5. The grooves 64 in upper wall 60 reduce the area of contact between an upper, or top, wall 66 of the oil control ring 56 and the upper wall 60 of the groove 54 when the oil control ring 56 is positioned against the upper wall 60 during the piston downstroke. Thus, the pressure of oil trapped between top wall 66 of the oil control ring 56 and the upper wall 60 of the groove 54 is reduced and resistance to rapid closure of the gap between the ring 56 and the top of the groove 54, when the piston 50 changes direction from an upstroke as shown in FIG. 4, to a downstroke as shown in FIG. 5, is dramatically decreased. As a result, the motion of the oil control ring 56 is optimized during the piston downstroke, in that the oil control ring 56 is able to rapidly move from the bottom of the groove 54 to the top of the groove 54, and remain at the top of the groove 54 during the piston downstroke.

In carrying out the present invention, the reduced contact area between the top wall 66 of the oil control ring 56 and the top wall 60 of the groove 54 is provided by appropriate shaping, or contouring, of one of the mating surfaces 60,66. In the preferred embodiment, shown in FIGS. 4 and 5, the circularly disposed grooves 64 are V-shaped channels that extend inwardly from the surface of the groove upper wall 60. The V-shaped channels are adjacently arranged so that the sides of the channels meet at the surface of the wall 60. Thus, only the intersecting sides of the V-channels contact the top surface of the oil control ring 56 when the ring 56 abuts the upper wall 60. Desirably, the circularly disposed grooves 64 are spaced sufficiently close to each other so that they collectively provide noncontacting areas between the opposed surfaces of the upper walls 60,66 of the ring 56 and the annular groove 54 that extends over at least about 90 percent of the mutually opposed areas of the ring 56 and groove 54 when the piston is moving in a downward direction.

It is important that the circularly disposed grooves 64 extend inwardly from the surface of the upper radial wall 60 of the groove 54 by a distance sufficient to provide a recess into which oil can be directed during closure of the gap between the ring 56 and the upper wall 60. Preferably, the inwardly extending distance of the circularly disposed grooves 64 is from about 50 percent to about 200 percent of the ring clearance in the groove, i.e., the difference between the predefined distance between the upper and lower walls 60,62 of the groove 54 and the thickness of the oil control ring 56.

If desired, the circularly disposed grooves 64 may have other contours, such as a U-shape, curved bottom and/or sides, square bottom, or other cross-sectional shape. Also, if desired, the circularly disposed grooves 64 may be formed by a continuous spirally-shaped groove in which successive radially spaced winds of the spiral constructively provide a plurality of grooves 64.

Figure 8:
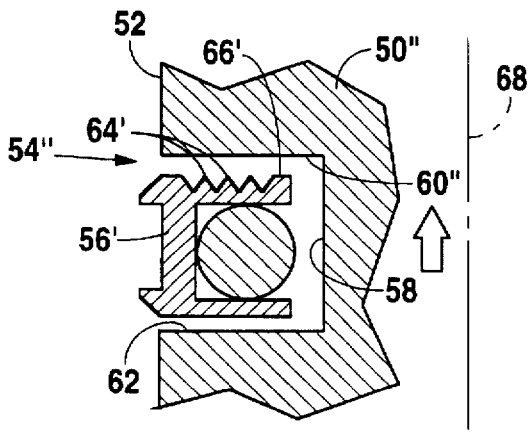
FIG. 8 is a cross-sectional view of a portion of a piston and ring assembly representing an alternative embodiment of the present invention.

Alternatively, circularly disposed grooves 64' may be formed in the surface of the upper wall 66' of an oil control ring 56', as illustrated in FIG. 8. The above-described spacing, shape and depth parameters are equally applicable to the grooves 64' formed in the oil control ring 56'.

Figure 6:
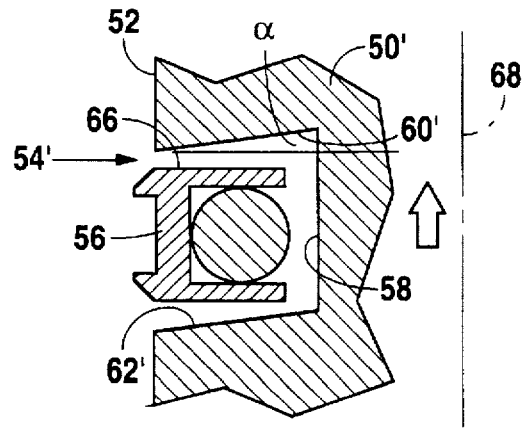
FIG. 6 is a cross-sectional view of a portion of a piston and ring assembly representing another embodiment of the present invention, showing the position of the oil control ring when the piston is moving in an upward direction.
Figure 7:
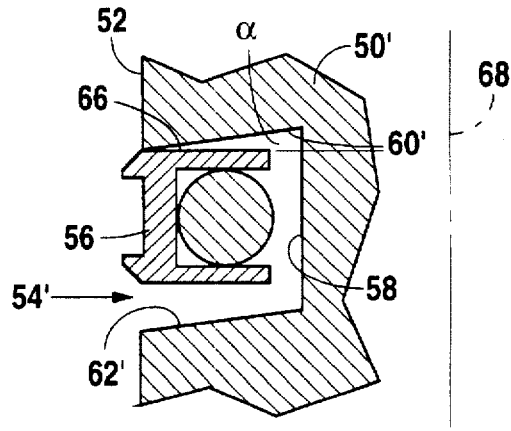
FIG. 7 is a cross-sectional view of a portion of the piston and ring assembly representing the embodiment of the present invention illustrated in FIG. 6, showing the position of the oil control ring when the piston is moving in a downward direction.

In another embodiment of the present invention, the upper wall of the groove is disposed at an angle that provides increasing clearance, in a radially inward direction, between the groove upper wall and the top of the ring. As illustrated in FIGS. 6 and 7, the piston 50' has an annular groove 54' in which the upper wall 60' is formed at an angle α with respect to a plane normal to a central axis 68 of the piston 50". In this arrangement, the normal plane is also parallel with the upper surface 66 of the oil control ring 56. The direction of the angle α is away from the upper surface 66 of the ring 56 so that a radially-tapered annular cavity, diverging away from the cylindrical surface 52' of the piston 50', is formed between the upper wall 60' of the groove 54' and the upper surface 66 of the oil control ring 56 when respective portions of the ring 56 and groove 54', adjacent the cylindrical surface 52 of the piston 50' are in mutual contact. Preferably, the angle α has a value of from about 4° to about 8°. Also, for better manufacturability, it may be desirable to machine the lower wall 62' of the groove 54' parallel with the upper wall 60' of the groove 54', as shown in FIGS. 6 and 7.

The tapered upper wall 60' of the oil control ring groove 54', in a manner similar to that of the above described circularly-grooved upper wall arrangement, reduces the area of mutual contact when the oil control ring 56 is positioned at the top of the groove 54' during the piston downstroke. Likewise, pressure developed in oil trapped between the oil control ring 56 and the top of the groove 54' is reduced, permitting rapid acceleration of the oil control ring 56 toward the upper wall 60' of the groove 54' when the piston 50' reverses direction at the top of its stroke.

Figure 9:
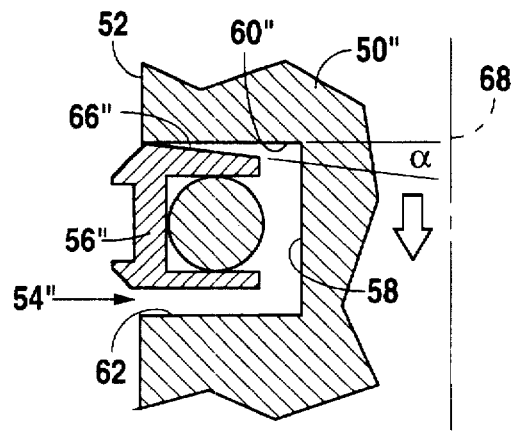
FIG. 9 is a cross-sectional view of a portion of a piston and ring assembly representing an additional alternative embodiment of the present invention.

Alternatively, the radially-tapered annular cavity may be provided by sloping the upper wall of the oil control ring. As shown in FIG. 9, the upper surface 66' of the oil control ring 56" is formed at an angle α with respect to a plane normal to a central axis 68 of the piston 50". In this arrangement, the normal plane is parallel with the upper wall 60" of the oil control ring groove 54". The direction of the angle α is away from the upper wall 60 of the groove 54" so that a radially-tapered annular cavity, diverging away from the cylindrical surface 52 of the piston 50", is formed between the upper wall 60" of the groove 54" and the upper surface 66" of the oil control ring 56" when respective portions of the ring 56" and the groove 54", adjacent the cylindrical surface 52 of the piston 50" are in mutual contact. Preferably, as described above, the angle α has a value of from about 4° to about 8°.

Thus, it can be readily seen that the present invention provides a piston and ring arrangement whereby oil is not trapped between an oil control ring and the top of its groove during closure of the gap between the two surfaces, and oil pressure between the two members is reduced. The reduced oil pressure permits rapid movement of the oil control ring toward the top of its groove when the piston is at top dead center and provides firm oil sealing quickly when the piston begins its downward movement. Accordingly, oil flow from the back of the oil control ring toward the cylinder wall is significantly reduced, and oil consumption in a reciprocating engine is advantageously decreased.

Although the present invention is described in terms of preferred exemplary embodiments, those skilled in the art will recognize that changes in the profile shape of the circular grooves or in the divergent cavity formed in either the top surface of the ring groove or in the top wall of the ring may be made, consistent with the following claims, without departing from the spirit of the invention. Such changes are intended to fall within the scope of the following claims. Other aspects, features and advantages of the present invention can be obtained from a study of this disclosure and drawings, along with the appended claims.

What is claimed is:

1. A piston and ring assembly for an internal combustion engine, comprising a piston having a cylindrical surface and an annular groove defined by a cylindrical wall spaced radially inwardly from said cylindrical surface of the piston, an upper wall extending inwardly from said cylindrical surface of the piston to the cylindrical wall of the groove, and a lower wall extending inwardly perpendicularly from said cylindrical surface of the piston to the cylindrical wall of the groove, said upper and lower walls of the groove being spaced apart at a predefined distance at the cylindrical surface of the piston; and an oil control ring disposed in said annular groove and having a thickness defined by the spaced apart distance between an upper and a lower surface of the ring that is less than the predefined distance between the upper and lower walls of the groove at the cylindrical surface of the piston, wherein one of said upper wall of the groove and said upper surface of the ring is disposed at an angle with respect to a plane normal to a central axis of the piston so that a tapered annular cavity, beginning at and diverging away from the cylindrical surface of the piston, is formed between the upper wall of the groove and the upper surface of the oil control ring when respective portions of the upper surface of the oil control ring and the upper wall of annular groove, adjacent the cylindrical surface of the piston are in mutual contact.

2. A piston and ring assembly, as set forth in claim 1, wherein said one of said upper wall of the groove and said upper wall of the ring diverges away from a plane normal to the central axis of the piston at an angle of from about 4° to about 8°.

3. A piston and ring assembly, as set forth in claim 1, wherein said upper wall of the groove diverges away from a plane normal to the central axis of the piston at an angle of from about 4° to about 8°.

* * * * *